3,644,469
Patented Feb. 22, 1972

3,644,469
1-(CYANOPHENOXY)-2-HYDROXY-3-SEC.-ALKYLAMINO-PROPANES

Herbert Köppe, Werner Kummer, Helmut Stähle, and Karl Zeile, Ingelheim am Rhein, and Werner Traunecker, Munster-Sarmsheim, Germany, assignors to Boehringer Ingelheim GmbH, Ingelheim am Rhein, Germany
No Drawing. Filed Dec. 18, 1968, Ser. No. 784,874
Claims priority, application Germany, Dec. 18, 1967, B 95,902; Dec. 22, 1967, P 16 43 266.9
The portion of the term of the patent subsequent to Aug. 5, 1986, has been disclaimed
Int. Cl. C07c 121/52, 121/66
U.S. Cl. 260—465 E        11 Claims

ABSTRACT OF THE DISCLOSURE

Racemic mixtures and optically active isomers of 1-phenoxy - 2 - hydroxy - 3 - sec. - alkylamino - propanes of the formula

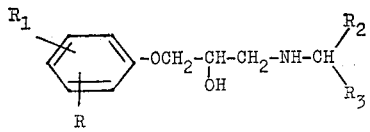
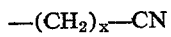

wherein R is selected from the group consisting of

—(CH$_2$)$_x$—CN

—(CH$_2$)$_x$—NH$_2$ and —(CH$_2$)$_{x+1}$—OH where $x$ is 0, 1, 2 or 3, carboxyl, alkoxycarbonyl of 1 to 5 carbon atoms of the alkoxy part and alkenyloxy and alkynyloxy of 2 to 5 carbon atoms, R$_1$ is selected from the group consisting of hydrogen, halogen, lower alkyl and lower alkoxy of 1 to 5 carbon atoms, lower alkenyl of 2 to 5 carbon atoms, cyano and nitro and R and R$_1$ taken together may be methylenedioxy, R$_2$ is an alkyl of 1 to 5 carbon atoms and R$_3$ is alkyl of 2 to 6 carbon atoms and their non-toxic, pharmaceutically acceptable acid addition salts having β-adrenolytic and blood pressure reducing properties.

OBJECTS OF THE INVENTION

It is an object of the invention to provide novel 1-phenoxy - 2 - hydroxy - 3 - sec. - alkylamino - propanes of Formula I and their acid addition salts.

It is another object of the invention to provide novel therapeutic compositions having β-adrenolytic activity.

It is a further object of the invention to provide a novel method of treating tachycardia and coronary diseases in warm-blooded animals.

These and other objects and advantages of the invention will become obvious from the following detailed description.

THE INVENTION

The novel 1-phenoxy - 2 - hydroxy - 3 - sec. - alkylamino-propanes of the invention are selected from the group consisting of racemic mixtures and optically active isomers of compounds of the formula

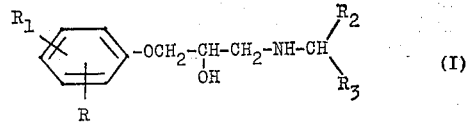
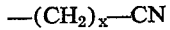

(I)

wherein R is selected from the group consisting of

—(CH$_2$)$_x$—CN

—(CH$_2$)$_x$—NH$_2$ and —(CH$_2$)$_{x+1}$—OH where $x$ is 0, 1, 2 or 3, carboxyl, alkoxycarbonyl of 1 to 5 carbon atoms of the alkoxy part and alkenyloxy and alkynyloxy of 2 to 5 carbon atoms, R$_1$ is selected from the group consisting of hydrogen, halogen, lower alkyl and lower alkoxy of 1 to 5 carbon atoms, lower alkenyl of 2 to 5 carbon atoms, cyano and nitro and R and R$_1$ taken together may be methylenedioxy, R$_2$ is an alkyl of 1 to 5 carbon atoms and R$_3$ is alkyl of 2 to 6 carbon atoms and their non-toxic, pharmaceutically acceptable acid addition salts.

The compounds of Formula I may be converted into their non-toxic, pharmaceutically acceptable acid addition salts by known ways such as acidifying a solution of the free base with the desired acid and recovering the acid addition salt by evaporation of the solvent or precipitation.

Examples of suitable acids for the acid addition salts are inorganic acids such as hydrochloric acid, hydrobromic acid, sulfuric acid, phosphoric acid, etc. and organic acids such as methane sulfonic acid, acetic acid, maleic acid, oxalic acid, lactic acid, tartaric acid, ascorbic acid, 8-chlorotheophylline, etc.

The novel compounds of Formula I may be prepared by a number of different methods using known chemical reactions such as the following convenient methods.

Method A

By reacting a compound of the formula

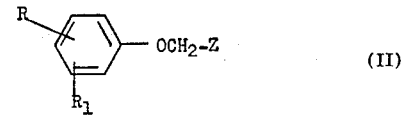
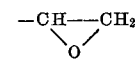

(II)

wherein R and R$_1$ have the above meanings and Z is

or —CHOH—CH$_2$—Hal where Hal is a halogen atom with an alkylamine of the formula $$H_2N-C\overset{R_2}{\underset{R_3}{H}}$$

III wherein R$_2$ and R$_3$ have the above definitions.

There are other methods of producing compounds of general Formula I. One may convert into the final compound of Formula I, a starting material, wherein the 1-phenoxy - 2-hydroxy-3-sec.-alkylamino-propane structure is already present, but wherein one of the R or R$_1$ substituents is still missing or only present in the form of a preliminary step, by introduction of the missing phenyl substituent or by conversion of the preliminary step of the phenyl substituent into the desired substituent R$_1$ or R.

Method B

By converting into compounds of Formula I a compound of the general formula

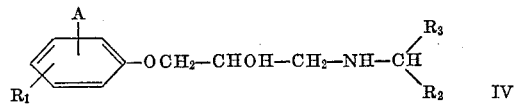

IV wherein R$_1$ to R$_3$ have the above meanings and A represents a group convertible into R by conventional methods, such as the aldehyde (—CHO) group (reduction to CH$_2$OH), the —CONH$_2$ or —CH=NOH group (splitting off water to the —CN group), a halo-alkyl group (reaction with alkali cyanide, ammonia or water to the substituents

(CH$_2$)$_x$—CN, (CH$_2$)$_x$—NH$_2$ or (CH$_2$)$_x$—OH wherein x represents one of the integers 1 to 3, an alkoxycarbonyl group (saponification to the carboxyl group), a nitro group (reduction to an amino group) or an amino group (diazotizing and heating with copper-(I)-cyanide to the —CN-group), using the measures required in each case (splitting off water, exchange reaction, reduction, diazotizing and heating with copper-(I)-cyanide).

Method C

By introducing a halogen atom into a compound of the general formula

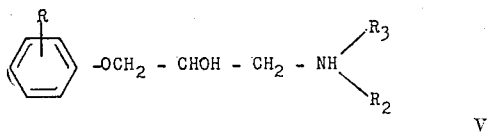

V wherein R, $R_2$ and $R_3$ have the above meanings. This may be performed, for example, by reaction of the starting compound of Formula V with a mixture of concentrated hydrogen peroxide and the corresopnding hydrogen halide at elevated temperature.

The starting material required for performing processes A to C are known or may be obtained by conventional processes. Thus, the epoxides of Formula II may be easily produced by reaction of epichlorohydrin with a phenol or phenolate of the general formula

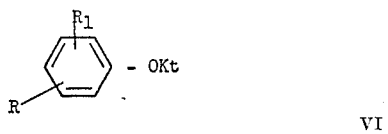

VI wherein R and $R_1$ have the above meanings and Kt represents hydrogen or a cation (for instance an alkali metal ion). The epoxides may be used for the production of other starting materials. For example, the halo-hydrins of Formula II may be produced by reacting the epoxides with the corresponding hydrogen halide.

The compounds of general Formulas IV to VI contain the final 1 - phenoxy-2-hydroxy-3-sec.-alkylamino-propane structure and may therefore be produced analogously to the process A described above, starting from the corresponding phenol via the corresponding 1 - phenoxy-2,3-epoxypropane by reaction with an alkylamine of Formula III.

The compounds of the invention possess an asymmetric carbon atom and occur therefore as racemates as well as in the form of optical antipodes. The latter may be obtained by separation of racemates with the aid of the conventional auxiliary acids, such as dibenzoyl-D-tartaric acid or D-3-bromocamphor-8-sulfonic acid or by the use of an optically active starting material.

The compounds of general Formula I and their non-toxic, pharmaceutically acceptable acid addition salts have shown in tests in guinea pigs valuable therapeutical properties, particularly β-adrenolytical properties and therefore may be used for treatment or prophylaxis of diseases of the coronaries and for treatment of cardiac arrythmia, especially of tachycardia in warm-blooded animals. The blood pressure decreasing properties of the said compounds are also valuable.

A preferred group of the compounds which have proved to be valuable are those compounds wherein R has an unsaturated group such as cyano, allyloxy or propargyloxy, preferably in the ortho position with respect to the propanolamine chain or hydroxymethyl and $R_1$ is hydrogen. The most preferred compounds of these valuable compounds are those in which R is cyano and $R_1$ is hydrogen.

Valuable β-receptor blocking agents are compounds in which R is cyano, allyloxy, propargyloxy or hydroxymethyl, $R_1$ is lower alkyl or halogen, $R_2$ is alkyl of 2 to 5 carbon atoms and $R_3$ is alkyl of 2 to 6 carbon atoms. Also strongly active are compounds wherein R is cyano, allyloxy, propargyloxy or hydroxymethyl, $R_1$ is lower alkoxy and $R_2$ and $R_3$ have the above broad definitions.

Specific compounds of Formula I which have shown particular therapeutic value are 1-(2-cyanophenoxy)-2-hydroxy-3-sec.-butylamino-propane,
1-(2-cyanophenoxy)-2-hydroxy-3-(1,3-dimethylbutyl amino)-propane,
1-(2-cyanophenoxy)-2-hydroxy-3-sec.-pentylamino-propane,
1-(2-cyanophenoxy)-2-hydroxy-3-(1-ethylpropyl-amino)-propane,
1-(2-cyanophenoxy)-2-hydroxy-3-(3,3-dimethylbutyl-(2)-amino)-propane,
1-(2-allyoxyphenoxy)-2-hydroxy-3-sec.-butylamino-propane,
1-(2-allyloxyphenoxy)-2-hydroxy-3-(3,3-dimethylbutyl-(2)-amino)-propane,
1-(2-propargyloxyphenoxy)-2-hydroxy-3-sec.-butylamino-propane,
1-(2-methoxy-4-cyanophenoxy)-2-hydroxy-3-sec.-butyl-amino-propane and
1-(3-hydroxymethylphenoxy)-2-hydroxy-3-sec.-butyl-amino-propane and their nontoxic pharmaceutically acceptable acid addition salts. The 2-cyanophenoxy compounds are preferred and the most valuable product is 1-(2-cyano-3-methyl-phenoxy) - 2-hydroxy-3-sec.-butylamino-propane and its salts.

The novel therapeutic compositions of the invention having β-adrenolytic activity are an effective amount of at least one compound of Formula I or its non-toxic, pharmaceutically acceptable acid addition salt and a major amount of a pharmaceutical carrier. An individual usual dose is 1 to 300 mg. depending upon the mode of administration. Preferred is 5 to 100 mg. when given orally and 1 to 20 mg. when given parenterally. The said compositions may be in the form of solutions, suspensions, tablets, dragees or sustained release forms admixed with usual galenic excipients, disintegrants, binders, coatings, lubricants, flavors, sweetening agents, sustained release agents or solubilizers. The compositions may also contain other pharmaceuticals such as coronary dilators or sympathicomimetics.

The novel method of the invention of treating tachycardia and coronary diseases in warm-blooded animals comprises administering a safe and effective amount of at least one compound of Formula I or its non-toxic, pharmaceutically acceptable acid addition salt. The said compounds may be administered orally or transcutaneously. The usual effective daily dosage is 0.0166 to 5.0 mg./kg. depending upon the mode of administration.

In the following examples there are described several preferred embodiments to illustrate the invention. However, it should be understood that the invention is not intended to be limited to the specific embodiments.

EXAMPLE I 1-(2-cyanophenoxy)-2-hydroxy-3-sec.-butylamino-propane.HCl 8.75 g. (0.05 mol) of 1-(2-cyanophenoxy)-2,3-epoxypropane were dissolved in 100 ml. of ethanol and 14.6 g. (0.2 mol) of sec.-butylamine were added thereto. After standing for 12 hours at 20° C., the reaction mixture was refluxed for 1.5 hours. After evaporation of the solvent in vacuo, the residue was dissolved in dilute HCl and extracted with ether. After separation of the aqueous phase, the latter was mixed with NaOH. The precipitated base was taken up in ether and the organic phase was separated, dried over $MgSO_4$ and evaporated in vacuo. The residue was dissolved in a little ethanol and acidified with ether HCl. The precipitate was filtered off and recrystallized from ethanol/ether to obtain 7.6 gm. of 1-(2-cyanophenoxy)-2-hydroxy-3-sec.-butylamino propane having a melting point of 124–126° C.

EXAMPLE II 1-(2-propargyloxyphenoxy)-2-hydroxy-3-sec.-butylamino-propane oxalate 3.5 g. (0.016 mol) of 1-(2-propargyloxyphenoxy)-2,3-epoxy propane were dissolved in 40 ml. of ethanol and after 5 ml. of sec.-butylamine were added, the reaction mixture was refluxed for 2 hours. After evaporation of the solvent in vacuo, the residue was dissolved in ether and the solution was acidified with an ether oxalic acid solution. The precipitate was recrystallized twice upon addition of ether to obtain 1.8 g. of 1-(2-propargyloxyphenoxy)-2-hydroxy-3-sec.-butylamino-propane oxalate having a melting point of 93–95° C.

EXAMPLE III 1-(2-methoxy-4-cyanophenoxy)-2-hydroxy-3-sec.-butylaminopropane.HCl 10 g. (0.05 mol) of 1-(2-methoxy-4-cyanophenoxy)-2,3-epoxy propane were mixed in 100 ml. of ethanol with 15 ml. of sec.-butylamine. After refluxing the mixture for 2 hours, the solvent was distilled off in vacuo and after acidification with dilute HCl the insoluble particles were filtered off. The aqueous phase was made alkaline with NaOH and the preciiptated base was taken up in ether. After wasing with water, the organic phase was dried over MgSO₄ and the ether was evaporated in vacuo and the base was recrystallized from acetonitrile. After isolation of the crystals, they were dissolved in ethanol, and the solution was acidified with ether HCl and the precipitate was recrystallized from ethanol with the addition of ether to obtain 6.9 g. of 1-(2-methoxy-4-cyanophenoxy)-2-hydroxy-3-sec.-butylamino-propane hydrochloride having a melting point of 144–146° C.

EXAMPLE IV 1-(2-allyloxyphenoxy)-2-hydroxy-3-sec.-butylamino-propane.HCl 7.7 g. (0.04 mol) of 1-(2-allyloxyphenoxy)-2,3-epoxy-propane were dissolved with 12 ml. of secondary butylamine in 80 ml. of ethanol and the solution was refluxed for 3 hours. After distilling off the solvent, the solid basic residue was dissolved in ethanol. Under addition of ether HCl the crystalline precipitate was filtered off and recrystallized from ethanol/ether to obtain 7.9 g. of 1-(2-allyloxyphenoxy) - 2 - hydroxy - 3 - sec.-butylamino-propane having a melting point of 101–102° C. (hydrochloride).

EXAMPLE V 1-(4-methoxycarbonylphenoxy)-2-hydroxy-3-sec.-butylaminopropane.HCl 10 g. (0.048 mol) of 1-(4-methoxycarbonylphenoxy)-2,3-epoxy-propane were refluxed in 100 ml. of ethanol with 7.3 g. (0.1 mol) of sec.-butylamine. The solvent was distilled off in vacuo and the remaining basic residue was recrystallized from ethyl acetate with addition of petroleum ether (boiling point of 40–60° C.) to obtain 8 gm. of 1 - (4-methoxyphenoxy)-2-hydroxy-3-sec.-butylaminopropane having a melting point of 72–75° C. 4 g. of the said product were dissolved in a little ethanol and ether HCl was added to obtain 3.8 g. of colourless hydrochloride salt of the said base having a melting point of 122–124° C.

EXAMPLE VI 1-(2-hydroxymethylphenoxy)-2-hydroxy-3-sec.-butylamino-propane oxalate 11.6 g. (0.064 mol) of 1-(2-hydroxymethylphenoxy)-2,3-epoxy-propane were dissolved in 100 ml. of ethanol and after addition of 8.8 g. (0.12 mol.) of sec.-butylamine, the mixture was refluxed for 3 hours. After distilling off the solvent in vacuo, 14 g. of an oily residue remained which was dissolved in a little ethanol and mixed with 5 g. of oxalic acid dissolved in ether. The crystalline precipitate was recrystallized twice from ethanol to obtain 10.8 g. of 1-(2-hydroxymethylphenoxy)-2-hydroxy-3-sec.-butylamino-propane oxalate having a melting point of 141–143° C.

EXAMPLE VII 1-(4-hydroxycarbonylphenoxy)-2-hydroxy-3-sec.-butylamino-propane.HCl 4 g. (0.014 mol) of 1-(4-methoxycarbonylphenoxy)-2-hydroxy-3-sec.-butylamino-propane were dissolved in 50 ml. of hydrochloric acid and the solution was refluxed for 2 hours while stirring. Then it was evaporated in vacuo and the residue was dissolved in ethanol. After filtering an adding ether, 3.5 g. of colourless crystals of 1-(4-hydroxycarbonylphenoxy)-2-hydroxy - 3 - sec. - butylaminopropane hydrochloride having a melting point of 170–173° C. were obtained.

EXAMPLE VIII 1-(2-cyanophenoxy)-2-hydroxy-3-(1,3-dimethylbutylamino)-propane.HCl 8.75 g. (0.05 mol) of 1-(2-cyanophenoxy)-2,3-epoxypropane were dissolved in 100 ml. of ethanol and after addition of 7.5 g. (0.075 mol) of 1,3-dimethylbutylamine, the solution was refluxed for 2 hours. After distilling off the solvent, the residue was treated with dilute HCl and freed from insoluble particles by filtration. The acid solution was extracted with ether and after separation of the organic phase, it was made alkaline with NaOH. The precipitated base was taken up in ether and the organic solution was washed with water, dried over MgSO₄ and evaporated in vacuo. The residue was dissolved in a little ethanol, made acidic with ether HCl and the precipitate was filtered off, and recrystallized from ethanol by the addition of ether to obtain 3.9 g. of 1-(2-cyanophenoxy)-2-hydroxy-3-(1,3-dimethylbutylamino)-propane hydrochloride having a melting point of 140–142° C.

EXAMPLE IX 1-(2-cyanophenoxy)-2-hydroxy-3-sec.-pentylamino-propane.HCl 8.75 g. (0.05 mol) of 1-(2-cyanophenoxy)-2,3-epoxypropane were refluxed together with 6.5 g. (0.075 mol) of sec.-pentylamine for 3 hours. After distilling off the ethanol, the residue was treated with dilute HCl and filtered off. The aqueous phase was extracted with ether and after making the aqueous solution alkaline, the precipitated base was taken up in ether. The organic phase was washed with water and dried over MgSO₄ and distilled to dryness. The basic residue was dissolved in ethanol and the solution was acidified with ether HCl. The precipitated crystals were recrystallized from ethanol by addition of ether to obtain 5.8 g. of 1-(2-cyanophenoxy)-2-hydhoxy-3-sec.-pentylamine hydrochloride having a melting point of 109–112° C.

EXAMPLE X 1-(2-aminomethylphenoxy)-2-hydroxy-3-sec.-butylamino-propane oxalate 10 g. (0.04 mol) of 1-(2-cyanophenoxy)-2-hydroxy-3-sec.-butylamino-propane were hydrogenated in 200 ml. of methanol with the addition of 15 ml. of NH₃ at 20° C. and normal pressure over Raney-nickel. After uptake of the theoretical quantity of hydrogen (1.8 l.) the catalyst was filtered off and the solution was evaporated. The oily residue was dissolved in acetone and a solution of 9 g. of oxalic acid in acetone was added to the mixture, whereby a precipitate formed. It was filtered off and recrystallized from ethanol and ether to obtain 7.5 g. of 1-(2-aminomethylphenoxy)-2-hydroxy-3-sec. - butylamino - propane oxalate having a melting point of 159–162° C.

EXAMPLE XI 1-(2-cyanophenoxy)-2-hydroxy-3-(1-ethylpropylamino)-propane.HCl 8.75 g. (0.05 mol) of 1-(2-cyanophenoxy)-2,3-epoxypropane were reacted in 100 ml. of ethanol with 6.5 g. (0.075 mol) of 1-ethylpropylamine by refluxing for 2 hours. After distilling off the ethanol, the residue was treated with dilute HCl and the insolubles were filtered off. The aqueous solution was mixed with NaOH and the precipitated base was taken up in ether. After washing with water, the organic phase was dried over $MgSO_4$ and the ether was distilled off. The residue was recrystallized from ethanol by the addition of ether HCl to obtain 5.8 g. of 1-(2-cyanophenoxy)-2-hydroxy-3-(1-ethylpropylamino)-propane hydrochloride having a melting point of 137–138° C.

EXAMPLE XII 1-(3,4-methylenedioxyphenoxy)-2-hydroxy-3-sec.-butylamino-propane.HCl 9.72 g. (0.05 mol) of 1-(3,4-methylenedioxyphenoxy)-2,3-epoxypropane were refluxed in 100 ml. of ethanol with 14.6 g. (0.2 mol) of sec.-butylamine for 3 hours. The solution was then processed as described in Example XI. The isolated base was recrystallized from ethyl acetate and petroleum ether (boiling point 40–60° C.). The crystalline product was dissolved in alcohol, ether HCl was added and the solution was filtered to obtain 6.8 g. of 1-(3,4-methylenedioxyphenoxy)-2 - hydroxy - 3-sec.-butylamino-propane hydrochloride having a melting point of 96–98° C.

EXAMPLE XIII 1-(2-aminophenoxy)-2-hydroxy-3-sec.-butylamino-propane.HCl 7.9 g. (0.03 mol) of 1-(2-nitrophenoxy)-2-hydroxy-3-sec.-butylamino-propane were hydrogenated in 200 ml. of methanol at 25° C. and normal pressure over Raney-nickel. After uptake of the theoretical quantity of hydrogen, the catalyst was filtered off and the filtrate is evaporated in vacuo and the residue recrystallized from ethyl acetate-pretroleum ether to obtain 3 g. of 1-(2-aminophenoxy-2-hydroxy-3-sec.-butylamino-propane having a melting point of 50–51° C. The base was dissolved in a little ethanol and after addition of ether HCl, 2.7 g. of the hydrochloride precipitated and had melting point of 175–181° C.

EXAMPLE XIV 1-(4-cyanophenoxy)-2-hydroxy-3-sec.-butylamino-propane.HCl 10.2 g. (0.04 mol) of 1-(4-cyanophenoxy)-2-hydroxy-3-bromo-propane were refluxed in 100 ml. of ethanol with 15 ml. of sec.-butylamine for 2.5 hours. After distilling off the solvent in vacuo, the residue was stirred with dilute HCl and the solution was extracted with ether. The aqueous phase was made alkaline with NaOH and the oily base was taken up in ether. After washing the ether solution with water, it was dried over $MgSO_4$ and the ether was distilled off. The solid base is recrystallized from ethyl acetate-petroleum ether, dissolved in ethanol, mixed with ether HCl and filtered to obtain 6.2 g. of colorless crystals of 1-(4-cyanophenoxy)-2-hydroxy-3-sec.-butylamino-propane having a melting point of 172–175° C.

EXAMPLE XV 1-(2-cyanophenoxy)-2-hydroxy-3-(3,3-dimethylbutyl-(2)-amino)-propane.HCl 12.35 g. (0.07 mol) of 1 - (2 - cyanophenoxy)-2,3-epoxypropane and 6.05 g. (0.06 mol) of 2-amino-3,3-dimethylbutane were dissolved in 50 ml. of methanol and the solution was refluxed for 5 hours. After distilling off the solvent, dilute HCl was added and the solution was extracted twice with ether. The aqueous phase was made alkaline with sodium hydroxide solution and the precipitated base was taken up in ether. After the addition of ether HCl 1 - (2 - cyanophenoxy) - 2 - hydroxy - 3 - (3,3 - dimethylbutyl - (2) - amino) - propane hydrochloride precipitated as crystalline powder. Upon recrystallization three times from isopropanol, 3.6 g. of product having a melting point of 172° C. were obtained.

EXAMPLE XVI 1-(2-allyloxyphenoxy)-2-hydroxy-2-(3,3-dimethylbutyl-(2)-amino)-propane.HCl Using the procedure of Example XV, 1-(2-allyloxyphenoxy - 2,3 - epoxypropane and 2 - amino - 3 - dimethylbutane in methanol were reacted to obtain a 17.3% yield of 1 - (2 - allyloxyphenoxy) - 2 - hydroxy - 3 - (3,3-dimethyl - butyl - (2) - amino) - propane hydrochloride having a melting point of 127° C.

EXAMPLE XVII 1-(2-cyanophenoxy)-2-hydroxy-3-(octyl-(2)-amino)-propane.HCl 12 g. (0.068 mol) of 1-(2-cyanophenoxy - 2,3 - epoxypropane and 9 g. (0.07 mol) of 2-octylamine were dissolved in 50 ml. of methanol and refluxed for 5 hours. After distilling off the solvent, dilute hydrochloric acid was added thereto and the solution was extracted with ether twice. The aqueous phase was then made alkaline with sodium hydroxide solution and the precipitated base was taken up in ether. Upon addition of ether hydrochloric acid, 1-(2-cyanophenoxy) - 2 - hydroxy-3-(octyl-(2)-amino)-propane hydrochloride crystallized. Upon recrystallization twice from isopropanol, 2 g. (8.6% yield) of product melting at 120° C. were obtained.

EXAMPLE XVIII 1-(2-cyanophenoxy)-2-hydroxy-3-[heptyl-(3)-amino]-propane.HCl

Using the procedure of Example XVII, 1-(2-cyanophenoxy)-2,3-epoxypropane and 3-heptylamine in methanol were reacted to obtain a 16.3% yield of 1-(2-cyanophenoxy)-2-hydroxy - 3 - [heptyl - (3) - amino]-propane hydrochloride having a melting point of 97° C.

EXAMPLE XIX 1-(3-hydroxymethylphenoxy)-2-hydroxy-3-sec.-butylamino-propane

Using the procedure of Example VI, 1-(3 - hydroxymethylphenoxy)-2,3-epoxypropane and sec.-butylamine in ethanol were reacted to obtain 1 - (3 - hydroxymethylphenoxy) - 2 - hydroxy - 3 - sec.-butylamino-propane having a melting point of 73–75° C.

EXAMPLE XX 1-(2-allyl-5-cyanophenoxy)-2-hydroxy-3-sec.-butylamino-propane.HCl Using the procedure of Example III, 1-(2-allyl-5-cyanophenoxy) - 2,3 - epoxypropane and sec.-butylamine in ethanol were reacted to obtain 1-(2-allyl - 5 - cyanophenoxy) - 2 - hydroxy - 3 - sec.-butylamino - propane hydrochloride having a melting point of 118–122° C.

EXAMPLE XXI 1-(2-cyanophenoxy)-2-hydroxy-3-(1,3,3-trimethylbutylamino)-propane.HCl Using the procedure of Example VIII, 1 - (2 - cyanophenoxy) - 2,3 - epoxypropane and 1,3,3 - trimethylbutylamine were reacted to obtain 1-(2 - cyanophenoxy)-2 - hydroxy - 3 - (1,3,3 - trimethylbutylamino) - propane hydrochloride having a melting point of 125–127° C.

EXAMPLE XXII 1-(2-cyano-4-chlorophenoxy)-2-hydroxy-3-sec.-butylamino-propane·HCl 8.2 gm. (0.029 mole) of 1-(2-cyanophenoxy)-2-hydroxy - 3 - sec. - butylamino-propane hydrochloride were dissolved in 35 ml. of concentrated hydrochloric acid and the solution was heated to 45° C., with stirring 3.75 gm. (3.033 mole) of 30% hydrogen peroxide were added dropwise thereto so that the temperature did not rise above 60° C. After the exothermic reaction had subsided, the reaction mixture was heated at 60–65° C. for 30 minutes and then was evaporated to dryness in vacuo. The residue was digested with ether whereby it became a solid. The solid was dissolved in a little acetonitrile and ether was added thereto to crystallize a solid. Repetition of the procedure gave 2.7 gm. of 1-(2-cyano-4-chlorophenoxy) - 2 - hydroxy - 3 - sec.-butylamino-propane hydrochloride having a melting point of 150–153° C.

EXAMPLE XXIII 1-(2-cyano-3-methylphenoxy)-2-hydroxy-3-sec.-butylamino-propane·HCl 29.4 gm. of raw 1-(2-cyano-3-methylphenoxy)-2,3-epoxypropane in 160 ml. of ethanol and 15 ml. of sec.-butylamine were refluxed for 1.5 hours and after distilling off the solvent, a black, oily residue was obtained. The residue was acidified with hydrochloric acid and thoroughly stirred. The aqueous phase was purified by filtration through Celite to remove insoluble, resin components, treated with activated charcoal and then extracted with ether. The solution was then made alkaline with sodium hydroxide and the precipitated base was taken up in ether. The ether phase was washed with water, dried over magnesium sulfate and evaporated to dryness to obtain 8.7 gm. of raw 1-(2-cyano-3-methylphenoxy)-2-hydroxy-3-sec.-butylamino-propane. The said product was dissolved in ethanol and ether hydrogen chloride was added thereto to form colorless crystals which upon recrystallization from ethanol by the adidtion of ether gave 5.1 gm. of the hydrochloride salt of the said base having a melting point of 136–138° C.

PHARMACEUTICAL EXAMPLES

Example A.—Tablets

| | Gm. |
|---|---|
| 1-(2-cyanophenoxy)-2-hydroxy-3-sec.-butylamino-propane·HCl | 40.0 |
| Corn starch | 164.0 |
| Sec. calcium phosphate | 240.0 |
| Magnesium stearate | 1.0 |
| | 445.0 |

Preparation: The individual ingredients were intimately admixed and the mixture was granulated in the conventional way. The granulate was pressed into tablets weighing 445 mg. with each tablet containing 40 mg. of active ingredient.

Example B.—Gelatin capsules

| | Gm. |
|---|---|
| 1 - (2-cyanophenoxy)-2-hydroxy-3-sec.-butylamino-propane·HCl | 25.0 |
| Corn starch | 175.0 |
| | 200.0 |

Preparation: The ingredients for the capsules were intimately admixed and 200 mg.-portions of the mixture were filled into gelatin capsules of suitable size. Each capsule contained 25 mg. of the active ingredient.

The said active ingredient may also be replaced by 1 - (2-cyanophenoxy)-2-hydroxy-3-sec.pentylamino-propane in the form of a non-toxic, pharmaceutically acceptable acid addition salt.

Example C.—Injection solution

| | Parts by weight |
|---|---|
| 1-(2-methoxy-4-cyanophenoxy)-2-sec.-butylamino-propane·HCl | 2.5 |
| Sodium salt of EDTA (ethylenediaminetetraacetic acid) | 0.2 |
| Distilled water, ad | 100.0 |

Preparation: The active ingredient and the EDTA-salt were dissolved in sufficient water and then brought to the desired volume with the addition of water. The solution was freed from suspended particles by filtration and filled into 1 cc. ampoules under aseptic conditions. Then the ampoules were sterilized and sealed. Each ampoule contained 25 mg. of active ingredient.

The above active ingredient may be replaced by 1-(3-hydroxymethylphenoy)-2-hydroxy-3-sec.-butylamino-propane in the form of a non-toxic, pharmaceutically acceptable acid addition salt.

Example D.—Dragees with sustained release

| Core: | G. |
|---|---|
| 1-(2-allyloxyphenoxy)-2-hydroxy-3-sec.-butylamino-propane·HCl | 25.0 |
| Carboxymethylcellulose (CMC) | 295.0 |
| Stearic acid | 20.0 |
| Cellulose acetate phthalate (CAP) | 40.0 |
| | 380.0 |

Preparation: The active ingredient, CMC and stearic acid were intimately mixed and the mixture was granulated in the usual way using a solution of CAP in 200 ml. of a mixture of ethanol/ethyl acetate. The granulate was pressed into 380 mg.-cores, which were coated with a sugary 5% solution of polyvinylpyrrolidone in water in the conventional manner. Each dragee contained 25 mg. of active ingredient.

The above active ingredient may be replaced by 1-(2-allyloxyphenoxy) - 2-hydroxy-3-(3,3-dimethylbutyl-(2)-amino)-propane in the form of a non-toxic, pharmaceutically acceptable acid addition salt.

Example E.—Tablets

| | G. |
|---|---|
| 1-(2-propargyloxyphenoy)-2-hydroxy-3-sec.-butylamino-propane·oxalate | 35.0 |
| 2,6-bis-(diethanolamino)-4,8-dipiperidinopyrimido-[5,4-d]-pyrimidine | 75.0 |
| Lactose | 164.0 |
| Corn starch | 194.0 |
| Colloidal silicic acid | 14.0 |
| Polyvinylpyrrolidone | 6.0 |
| Magnesium stearate | 2.0 |
| Soluble starch | 10.0 |
| | 500.0 |

Preparation: The active ingredient together with lactose, corn starch, colloidal silicic acid and polyvinylpyrrolidone was granulated after having been admixed intimately in the conventional way using an aqueous solution of the soluble starch. The granulate was mixed with the magnesium stearate and pressed into 1000 tablets weighing 500 mg., each containing 35 mg. of the first and 75 mg. of the second active ingredient.

The above active ingredient may be replaced by 1-(2-cyanophenoxy) - 2 - hydroxy - 3-(3,3-dimethylbutyl-(2)-amino)-propane or 1-(2-cyanophenoxy)-2-hydroxy-3-(1-ethylpropylamino)-propane in the form of a nontoxic, pharmaceutically acceptable acid addition salt.

Various modifications of the compositions and method of the invention may be made without departing from the spirit or scope thereof.

We claim:

1. A compound selected from the group consisting of racemates and optically active isomers of 1-phenoxy-2-hydroxy-3-sec.alkylamino-propanes of the formula

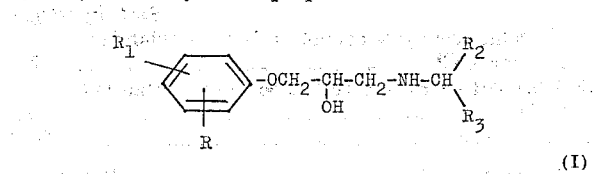

wherein R is —$(CH_2)_x$—CN where $x$ is 0, 1, 2 or 3, $R_1$ is selected from the group consisting of hydrogen, chlorine, lower alkyl and lower alkoxy of 1 to 5 carbon atoms, lower alkenyl of 2 to 5 carbon atoms, cyano and nitro, $R_2$ is an alkyl of 1 to 5 carbon atoms and $R_3$ is an alkyl of 2 to 6 carbon atoms or their non-toxic, pharmaceutically acceptable acid addition salts.

2. A compound of claim 1 wherein R is cyano, $R_1$ is selected from the group consisting of lower alkyl and chlorine, $R_2$ is an alkyl of 1 to 5 carbon atoms and $R_3$ is an alkyl of 2 to 6 carbon atoms.

3. A compound of claim 1 wherein R is cyano, $R_1$ is lower alkoxy, $R_2$ is an alkyl of 1 to 5 carbon atoms and $R_3$ is an alkyl of 2 to 6 carbon atoms.

4. A compound of claim 1 wherein R is 2-cyano, $R_1$ is hydrogen, $R_2$ is alkyl of 1 to 5 carbon atoms and $R_3$ is alkyl of 2 to 6 carbon atoms.

5. A compound of claim 1 selected from the group consisting of 1-(2-cyanophenoxy)-2-hydroxy-3-sec.butylaminopropane or its non-toxic, pharmaceutically acceptable acid addition salts.

6. A compound of claim 1 selected from the group consisting of 1 - (2 - cyanophenoxy)-2-hydroxy-3-(1,3-dimethylbutylamino)-propane or its non-toxic, pharmaceutically acceptable acid addition salts.

7. A compound of claim 1 selected from the group consisting of 1-(2-cyanophenoxy)-2-hydroxy-3-sec.pentylaminopropane or its non-toxic, pharmaceutically acceptable acid addition salts.

8. A compound of claim 1 selected from the group consisting of 1-(2-cyanophenoxy)-2-hydroxy-3-(1-ethylpropylamino)-propane or its non-toxic, pharmaceutically acceptable acid addition salts.

9. A compound of claim 1 selected from the group consisting of 1-(2-cyanophenoxy)-2-hydroxy-3-(3,3-dimethylbutyl-(2)-amino)-propane or its non-toxic, pharmaceutically acceptable acid addition salts.

10. A compound of claim 1 selected from the group consisting of 1-(2-methoxy-4-cyanophenoxy)-2-hydroxy-3-sec.butylamino-propane or its non-toxic, pharmaceutically acceptable acid addition salts.

11. A compound of claim 1 selected from the group consisting of 1-(2-cyano-3-methylphenoxy)-2-hydroxy-3-sec.-butylamino-propane or its non-toxic, pharmaceutically acceptable acid addition salts.

References Cited
UNITED STATES PATENTS 3,459,782    8/1969    Koppe et al. _____ 260—465

CHARLES B. PARKER, Primary Examiner

C. F. WARREN, Assistant Examiner

U.S. Cl. X.R.

260—340.9, 471, 519, 570.5, 570.7; 424—282, 304, 309, 317, 330